United States Patent [19]

Shah et al.

[11] Patent Number: 5,206,828
[45] Date of Patent: Apr. 27, 1993

[54] SPECIAL CARRY SAVE ADDER FOR HIGH SPEED ITERATIAVE DIVISION

[75] Inventors: Salim A. Shah; Thomas W. Lynch, both of Austin, Tex.

[73] Assignee: Advanced Micro Devices, Inc., Austin, Tex.

[21] Appl. No.: 806,820

[22] Filed: Dec. 6, 1991

Related U.S. Application Data

[63] Continuation of Ser. No. 505,350, Apr. 2, 1990, abandoned.

[51] Int. Cl.⁵ .............................. G06F 7/50; G06F 7/52
[52] U.S. Cl. ...................................... 364/784; 364/761
[58] Field of Search ................ 364/761, 764, 766–768, 364/784

[56] References Cited

U.S. PATENT DOCUMENTS

| | | | |
|---|---|---|---|
| 4,939,686 | 7/1990 | Fandrianto | 364/767 |
| 4,949,295 | 8/1990 | Stearns | 364/761 |
| 5,023,827 | 6/1991 | Kehl et al. | 364/761 |

Primary Examiner—Long T. Nguyen
Attorney, Agent, or Firm—Johnson & Gibbs

[57] ABSTRACT

A special carry save adder includes structure for performing multiple addition operations, common input structure to the structure for performing multiple addition operations, and mixing structure for selecting the desired result of the multiple addition operations.

6 Claims, 2 Drawing Sheets

SPECIAL CARRY SAVE ADDER FOR HIGH SPEED ITERATIAVE DIVISION

This is a continuation of application Ser. No. 07/505,350, filed Apr. 2, 1990, now abandoned.

CROSS REFERENCE TO RELATED APPLICATIONS

This application is related to the following U.S. patent application Ser. Nos.:

| SER. NO. | TITLE | INVENTOR | U.S. PAT. NO. | ISSUE DATE |
|---|---|---|---|---|
| 07/503,817 | Pipelined Floating Point Processing Unit | Perlman, et al. | 5,053,631 | 10-01-91 |
| 07/503,819 | Normalizing Pipelined Floating Point Processing Unit | Gupta, et al. | 5,058,048 | 10-15-91 |
| 07/504,127 | Arithmetic Unit Having Multiple Accumulators | Tamura, et al. | 5,128,888 | 07-07-92 |
| 07/505,351 | Apparatus and Method for Collecting Boolean Condition of Multiple Operations | McMinn, et al. | (still pending) | |
| 07/503,818 | High Speed Mix Radix Adder | Lynch, et al. | (now abandoned) | |
| 07/678,660 | (continuation of 07/503,818 filed on 08-13-91 and now abandoned) | | | |
| 07/840,622 | (continuation of 07/678,660 filed on 02-21-92 and still pending) | | | |
| 07/503,822 | Radix 4 Carry-Look-Ahead Tree and Redundant Cell Therefor | Lynch, et al. | 5,095,458 | 03-10-92 |
| 07/504,324 | High Speed Divider With Square Root Option | Lynch, et al. | 5,128,891 | 07-07-92 |

All cross reference are filed on even date herewith and assigned to the assignee of the present invention which are all hereby incorporated by this reference thereto.

BACKGROUND OF THE INVENTION

1. Field of the Invention

This invention relates to a dividing apparatus and, more particularly, to a high-speed dividing apparatus for electronic digital computers.

2. Description of Related Art

A carry save adder (CSA) is distinguished from other types of adders by the fact that the carry bits and half-sum bits which result from each addition are not immediately combined or consolidated but instead are saved separately from each other for subsequent use in the next addition performed by the CSA, the inputs to which comprise the saved carry and half-sum bits (the latter hereinafter referred to simply as "sum bits" for convenience) and the bits of an operand which is being added to, or in some instances being effectively substracted from, the value jointly represented by these saved carry and sum bits.

Carry save adders commonly are employed in high-speed multipliers, where they generally are able to function more rapidly than "carry propagate" or "ripple carry" adders because a carry save adder does not completely perform the relatively time-consuming process of combining carries with sum bits between successive additions in the multiplication process but instead defers this task until the final cycle of the multiplying operation. It has been proposed also to use a carry save adder in dividing operations, as disclosed in U.S. Pat. No. 4,084,254 to R. E. Birney et al, the advantage of this proposal being that it enables a combination multiplier-divider unit to be provided with a single adder of the CSA type for use in both multiplying and dividing operations.

As they generally are employed, carry save adders have a disadvantage that has detracted from their utility despite the above-described speed advantage which they offer. There are many instances during the performance of adding, complementing and column shifting functions where a carry or sum bit manifested at the output side of any order or bit position in the adder must be re-entered as input to that same order or bit position in the adder. Because of this re-entrancy requirement, it has been customary to provide carry save adders in duplicate and operate the pair of adders in alternation so that an output bit from any order or position in one adder of the pair may, if necessary, be applied as input to the corresponding order or position in the other adder of the pair, without thereby causing an undesirable interaction between an output bit and its re-entered counterpart at the same CSA bit position. This duplication of adder equipment introduces a cost consideration which must be weighed against the speed consideration in a conventional CSA installation. While it is desirable to eliminate the use of duplicate adder equipment and employ a single CSA having only one ordered set of bit positions for achieving the results described above, this must be accomplished without impairing the ability of the CSA to perform all of the functions required of it. In particular, some way must be provided for handling the re-entrancy problem where there is no duplicate set of CSA bit positions available for that purpose.

Where a carry save adder is being used as part of a divider apparatus, as proposed in the aforesaid Birney et al. patent, there is an additional requirement that the CSA must provide information that can be used in a lookahead logic network to determine beforehand from the various CSA output values whether or not each proposed complemental subtraction in the division process may be successfully performed without causing an overdraft. For this purpose each CSA bit position must provide two types of output bits: (1) latched sum and carry output bits which can be set or changed only at predetermined clock times, being stable at all other times; and (2) unlatched sum and carry bits (hereinafter referred to as "presum" and "precarry" bits), whose respective values at every instant will be determined by the instantaneous values of the current inputs to that CSA bit position, the latter being used in making the trial determinations to prevent the occurrence of overdrafts. The conventional carry save adder cannot provide both latched and unlatched outputs from the same bit cell.

In the course of normal operation, a digital computer performs numerous calculations including addition, subtraction, multiplication, and division. Division is, by far, the most complex of these operations, typically requiring more hardware and computational time than the other operations. The prior art provides a variety of division techniques, which have in common the utilization of an interative method for quotient production. The iterative method generally involves generating a single quotient digit in each iterative cycle. Three of the prior art techniques are discussed below.

A restoring division technique is characterized by the selection of quotient digits in the range 0, 1, . . . , (beta−1); where beta is the radix of the division. Thornton, Design of a Computer-The Control Data 6600, (Scott, Foresman and Co., Glenview, Ill., 1970, pp. 101–105) discloses a radix-4 divider employing this division technique. The apparatus incorporates three adder/subtractor units for the simultaneous calculation of candidate divisor multiples and operates according to a method similar to that of manual, pencil-and-paper division.

A second division technique, non-restoring division, is characterized by the selection of quotient digits having the values −(beta−1), . . . , −2, −1, 1, 2, . . . , (beta−1). A procedure employing a modified form of this technique is discussed by Nandi et al. in "A Simple Technique for Digital Division" (Communications of the ACM, No. 10, 1967, pp. 299–301). In the quotient digit-producing iterative phase, the Nandi et al. method generates successive "partial remainders," values reflecting the difference between the numerator and the multiplicative product of the denominator and the previously generated quotient digits. Within the iterative phase, a single radix-beta quotient digit is generated as a mathematical function of each partial remainder.

A variant of the non-restoring division technique is provided by SRT division, which is also characterized by the selection of quotient digits in the range −(beta−1), . . . , −1, 0, 1, . . . , (beta−1). A discussion of the SRT technique is provided by Robertson, "A New Class of Digital Division Methods," IRE Transactions on Electronic Computers, vol. EC-7, pp. 218–222, September, 1958. The Robertson method employs an iterative process similar to that used by the Nandi et al. However, in Robertson, each quotient digit is generated by operation of a selection circuit, which incorporates a large look-up table.

Drawbacks presented by the prior division methods are numerous. In Thornton, for example, the performance increases do not offset the costs associated with the increased hardware requirements. Both Robertson and Nandi et al. generate quotient digits in a manner which requires increased hardware in order to achieve conversion of individual quotient digits to a conventional, restoring form. Nandi et al., further, requires examination, in some cases, of two leading radix-beta digits of a partial remainder in order to produce a single quotient digit. Moreover, the Robertson method requires a look-up table having a size which rapidly increases as a function of increased radix. Further, this method requires a large data path length, i.e., the bit-wise length of signals transferred between divider elements.

SUMMARY OF THE INVENTION

In light of the deficiencies presented by the prior art division methods, an object of this invention is to provide a method and apparatus to perform digital division which is faster and which requires minimal hardware. Another object of the invention is to provide a division method and apparatus which operates in a higher radix and is thus capable of achieving rapid quotient digit generation.

Yet another object of the present invention is to enable arithmetic operations of the kind described above to be accomplished with a single carry save adder of economical and compact design.

Still yet another object of the present invention is to reduce iteration delay in addition operations.

Yet another object of the present invention is to reduce redundancies in configurations heretofore proposed.

According to the teachings of the present invention, a special carry save adder includes means for performing multiple addition operations, common input means to the means for performing multiple addition operations, and means for selecting the desired result of the multiple addition operations.

BRIEF DESCRIPTION OF THE DRAWINGS

Other objects, advantages, and novel features of the present invention will become apparent from the following detailed description of the invention when considered in conjunction with the accompanying drawings wherein.

DETAILED DESCRIPTION OF THE INVENTION

As should now be understood, the present invention addresses the problem of too much time being consumed in SRT and NR division for a quotient prediction logic block to produce signals to start each new iteration based on the results (the partial remainder) of the previous iteration. The present invention provides a solution to this problem.

Figure 1:
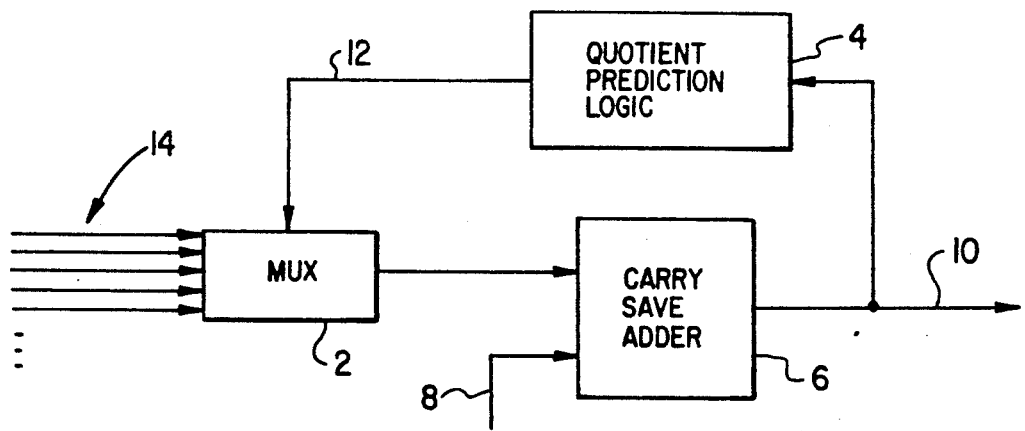
FIG. 1 is a block diagram of a prior art carry save adder configuration.

Once a minimum circuit is found for the quotient prediction logic, the only way to reduce iteration time is to overlap the CSA operation with the quotient prediction calculations. To appreciate this better, reference made now be had to FIG. 1, wherein a prior art carry save adder configuration may be seen to comprise a mux 2, carry save adder 6, and quotient prediction logic block 4. During operation of such a configuration, a partial remainder $PR_i$ is input to the adder 6 via line 8 and a partial remainder $PR_{i+1}$ is output on result line 10. Between block 4 and mux 2 are quotient select lines 12. Additionally, mux 2 has a number of inputs 14 thereto, the exact number of which depends upon the radix employed in the overall configuration. With such an overall configuration, total time delay is equal to the sum of the time delays in the adder 6, block 4, and mux 2. With this understood, it should be appreciated that if the time delay of block 4 and adder 6 could be made to "overlap", the overall configuration would have a shorter total time consumption.

Figure 2:
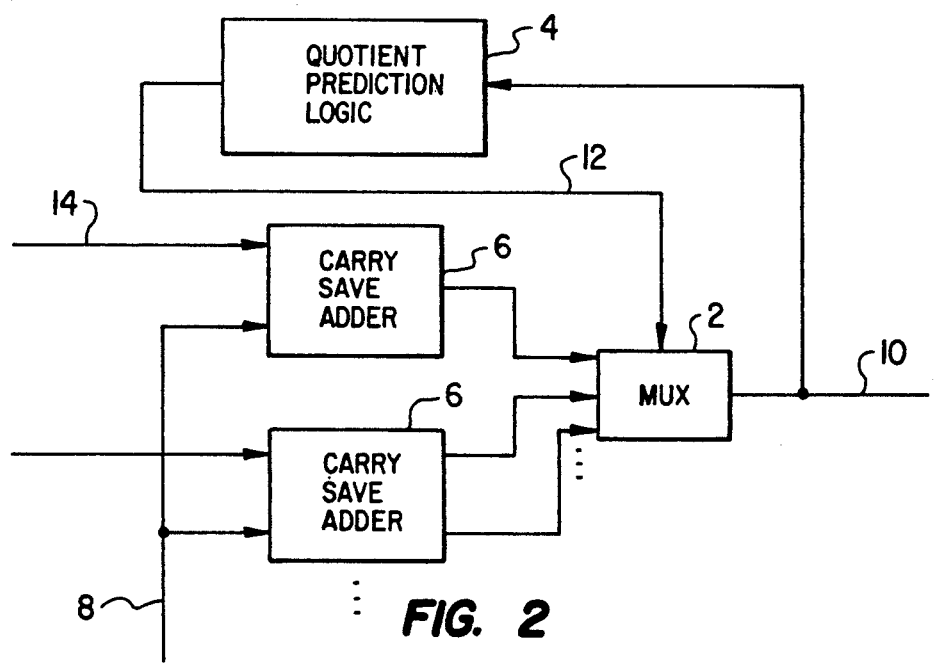
FIG. 2 is a block diagram of a new carry save adder configuration, having a shorter iterative delay than the configuration of FIG. 1.

One way to effect the overlap mentioned above would be to use multiple CSA's and then mux out the correct answer at the end. Such a configuration is shown in FIG. 2 wherein sum and carry signals $PR_i$ are input to multiple adders (only two of which are shown) via line 8 and the output $PR_{i+1}$ leaves the mux 2 via line 10. Because the adders 6 can operate at the same time as the block 4 and because use of multiple adders ensures the correct values will be produced for determination by the mux 2, CSA delay time may be neglected and the total iteration time considered to be the sum of the block 4 delay and the mux 2 delay.

The problem with the solution proposed immediately above and shown in FIG. 2 is that for high radix divides such a solution would be very expensive in terms of transfer count and chip area. The solution shown in FIG. 2, may be considered to be an expensive, fast solution to the problem solved by the present invention.

Figure 3:
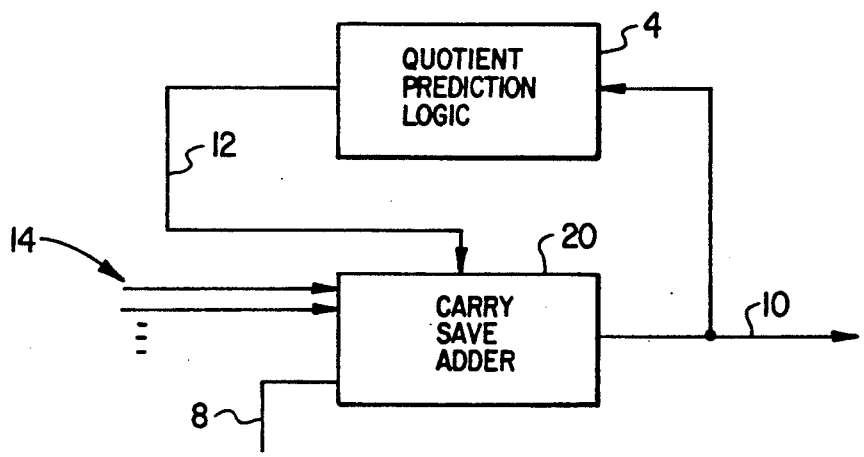
FIG. 3 is a block diagram of a special carry save adder configuration according to the teachings of the present invention.

Referring now to FIG. 3, an overall configuration including a special carry save adder 20 according to the teachings of the present invention is shown therein. The special carry save adder 20 according to the present invention should be understood to perform muxing and three operand adding in one circuit. Iterative delay with such a configuration is the sum of the adder 20 delay and the block 4 delay, which would be much shorter than the delay of the prior art configuration shown in FIG. 1. Additionally, this new carry save adder 20 is much smaller than multiple CSA's and a mux; thus, it would be preferred in most applications to the configuration discussed above with reference to FIG. 2.

Figure 4:
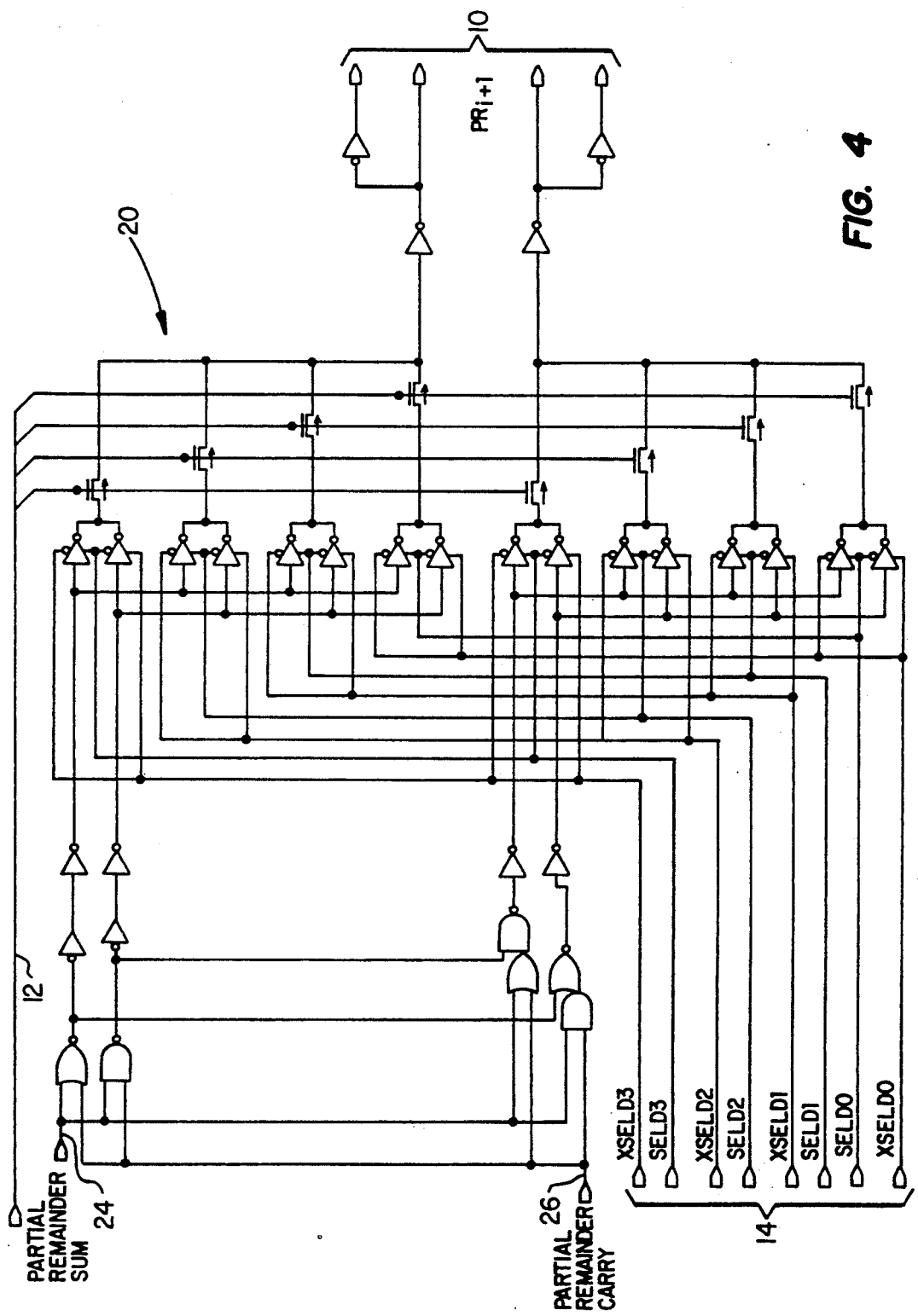
FIG. 4 is a more detailed, schematic diagram of the adder shown in FIG. 3.

Referring now to FIG. 4, further details regarding adder 20 are depicted. With reference to FIG. 4, it should be appreciated that signals from the quotient prediction logic block 4 enter adder 20 via line 12, partial remainder sum signals enter the adder 20 via line 24, and partial remainder carry signals enter the adder via line 26. The various other inputs, generally designated by reference numeral 14 relate to the employed algorithm and radix, e.g., radix 4. In an embodiment of the present invention that has actually been constructed, these inputs are the true and complement functions of four different values, D0, D1, D2 and D3. Having these functions available with the sum and carry values allows independent calculation of all possible additions to be made within an adder according to the present invention. Therefore, once an indication is available as to the proper selection to be made among the various values, all data is available to make that proper selection. The partial remainder output, $PR_{i+1}$, leaves adder 20 via lines 10.

Referring to FIG. 4, those skilled in the art should appreciate that since quotient prediction time dominates, delay through the new adder 20 may be measured at one gate delay. Further, it should be appreciated that the circuit shown in FIG. 4 is much smaller than multiple CSA's leader to a mux because of shared logic among two the input terms, PR $sum_i$ and PR $car_i$, that would be replicated many times in an alternative implementation. Effectively, all of the common partial remainder inputs into all of the CSA's in FIG. 2 are shared in the embodiment of the present invention. Such sharing of inputs also allows common determination of output to be accomplished, eliminating the need for an independent mux.

Based on the foregoing, those skilled in the art should understand that the present invention reduces the iteration time by two gate delays in the main iteration path. The present invention is also relatively inexpensive, at least in comparison to methods employing adding and then selecting operations.

Those skilled in the art will recognize that many modifications and variations besides those specifically mentioned may be made in the structure and techniques described herein without departing from the concept of the present invention. Accordingly, it should be understood that within the scope of the appended claims, the present invention may be practiced otherwise than as specifically described herein.

What is claimed is:

1. A carry save adder for operation in conjunction with a quotient prediction logic circuit, said quotient prediction logic circuit providing quotient prediction logic signals, and also in conjunction with circuitry carrying true functions of a plurality of values and complement functions of a plurality of values, said plurality of values provided so as to be processed by said carry save adder, said carry save adder comprising:
   means for receiving said quotient prediction logic signals from said quotient prediction logic circuit;
   means for receiving partial remainder sum signals;
   means for receiving partial remainder carry signals;
   means for receiving said true functions of said plurality of values;
   means for receiving said complement functions of said plurality of values;
   means for manipulating said received true functions, complement functions, partial remainder sum signals, and partial remainder carry signals to produce all possible additions that may be made therefrom; and
   means for selecting a proper one of said all possible additions, said means for selecting comprising a multiplexing means connected serially in circuit with said means for manipulating, said multiplexing means also connected in circuit so as to receive said quotient prediction logic signals which direct said means for selecting to said proper one of all possible additions, and said multiplexing means also connected in a feed back loop type of connection with said quotient prediction logic circuit, whereby the operation of the carry save adder and the operation of the quotient prediction logic circuit are overlapped to speed their combined operation.

2. A carry save adder as recited in claim 1, further comprising means for separating said quotient prediction logic signals into four separate signal paths, wherein said multiplexing means comprise eight multiplexers, wherein said means for receiving the true functions of said plurality of values comprises a first four input lines, and wherein said means for receiving the complement functions of said plurality of values comprise a second four input lines.

3. A carry save adder as recited in claim 2, further comprising input term logic, wherein said means for receiving partial remainder sum signals comprises only one initial input line, and wherein said means for receiving partial remainder carry signals comprises only one initial input line, and wherein said means for receiving partial remainder sum signals and said means for receiving partial remainder carry signals share said input term logic so as to support eight separate additions, four each with said true functions and said complement functions.

4. A carry save adder as recited in claim 1, wherein said plurality of value consists of four values.

5. A carry save adder as recited in claim 1, wherein said plurality of values consists of eight values.

6. A carry save adder as recited in claim 1, wherein said plurality of values consists of sixteen values.

* * * * *